United States Patent
Gonzalez-Martin et al.

[11] Patent Number: 6,156,211
[45] Date of Patent: *Dec. 5, 2000

[54] ENHANCED PHOTOCATALYTIC CONVERSION OF METHANE TO METHANOL USING A POROUS SEMICONDUCTOR MEMBRANE

[75] Inventors: Anuncia Gonzalez-Martin, San Jose, Calif.; Oliver J. Murphy, Bryan, Tex.

[73] Assignee: LynnTech, Inc., Collegestation, Tex.

[*] Notice: This patent is subject to a terminal disclaimer.

[21] Appl. No.: 09/115,040

[22] Filed: Jul. 14, 1998

Related U.S. Application Data

[63] Continuation-in-part of application No. 08/791,599, Jan. 31, 1997, Pat. No. 5,779,912.

[51] Int. Cl.[7] .............................. C02F 1/32; C07C 29/48
[52] U.S. Cl. ..................... 210/748; 210/758; 210/763; 210/760; 204/157.3; 204/157.9; 502/5
[58] Field of Search ................................ 210/748, 749, 210/758–760, 763, 198.1, 205, 209; 502/5, 103; 422/24, 186, 186.3; 204/157.15, 157.3, 157.6, 157.9

[56] References Cited

U.S. PATENT DOCUMENTS

| | | |
|---|---|---|
| 4,544,470 | 10/1985 | Hetrick . |
| 4,684,537 | 8/1987 | Graetzel . |
| 4,694,179 | 9/1987 | Lew et al. . |
| 4,792,407 | 12/1988 | Zeff . |
| 4,836,929 | 6/1989 | Baumann . |
| 4,849,114 | 7/1989 | Zeff . |
| 4,867,052 | 9/1989 | Cipelletti . |
| 4,888,101 | 12/1989 | Cooper . |
| 4,892,712 | 1/1990 | Robertson . |
| 4,954,465 | 9/1990 | Kawashima et al. . |
| 4,997,576 | 3/1991 | Heller . |
| 5,035,784 | 7/1991 | Anderson et al. . |
| 5,045,288 | 9/1991 | Raupp et al. . |
| 5,126,111 | 6/1992 | Al-Ekabi . |
| 5,137,607 | 8/1992 | Anderson . |
| 5,256,379 | 10/1993 | DeLoach . |
| 5,259,962 | 11/1993 | Later . |
| 5,266,215 | 11/1993 | Engelhard . |
| 5,288,461 | 2/1994 | Gray . |
| 5,456,881 | 10/1995 | Bandel . |
| 5,460,705 | 10/1995 | Murphy . |
| 5,462,674 | 10/1995 | Butters et al. . |
| 5,501,801 | 3/1996 | Zhang . |
| 5,720,858 | 2/1998 | Noceti . |
| 5,779,912 | 7/1998 | Gonzalez-Martin . |
| 5,790,934 | 8/1998 | Say et al. . |

OTHER PUBLICATIONS

Ronald L. Cook and Anthony F. Sammells, Ambient Temperature Methane Activation to Condensed Species Under Cathodic Conditions, pp. 2007–2008, Jun. 6, 1990.

Annucia Gonzalez–Martin, Destruction of Chemical Warfare Agents by Enhanced Photocatalytic Reactors at Semiconductor Ceramic Membranes, pp. 4–68.

Anuncia Gonzalez–Martin, Mineralization of Explosive Pollutants in Aqueous Streams by a Novel Advanced Oxidation Photocatalytic Process, pp. 3–25.

Characterization of Semiconductor Materials, pp. 660–664.

Anuncia Gonzalez–Martin, Destruction of Chemical Warfare Agents by Enhanced Photocatalytic Reactions at Semiconductor Ceramic Membranes, pp. 3–25.

*Primary Examiner*—David A. Simmons
*Assistant Examiner*—Fred Prince
*Attorney, Agent, or Firm*—Streets & Steele; Jeffrey L. Streets

[57] ABSTRACT

A method and apparatus for the conversion of methane in solution or gas provides photochemical conversion in a unique two-phase or three-phase boundary system formed in each pore of a semiconductor membrane in a photocatalytic reactor. In a three-phase system, gaseous oxidant, methane contained in a liquid, and solid semiconductor photocatalyst having a metal catalyst disposed thereon meet and engage in an efficient conversion reaction. The porous membrane has pores which have a region wherein the meniscus of the liquid varies from the molecular diameter of water to that of a capillary tube resulting in a diffusion layer that is several orders of magnitude smaller than the closest known reactors.

43 Claims, 6 Drawing Sheets

ENHANCED PHOTOCATALYTIC CONVERSION OF METHANE TO METHANOL USING A POROUS SEMICONDUCTOR MEMBRANE

This is a continuation-in-part application of U.S. patent application Ser. No. 08/791,599, filed Jan. 31, 1997 now U.S. Pat. No. 5,779,912.

This invention was made with Government support under contract DAAH04-95-C-0019 awarded by the Army. The Government has certain rights in this invention.

BACKGROUND OF THE INVENTION

1. Field of the Invention

This invention relates to a method for the conversion of methane. More particularly, the invention relates to the photocatalytic conversion of methane to methanol.

2. Background of the Related Art

The ability to directly convert methane to methanol in economically satisfactory yields is important in many industries including the oil and gas industry. Methane is an abundant material found world-wide, particularly in the form of natural gas, which is difficult and costly to transport. Conversion of natural gas to methanol in a liquid form allows for safer, more efficient transportation. In addition, methanol may be used as a valuable commercial feedstock, an important ingredient in the production of reformulated motor fuels, and/or an environmentally compatible fuel in itself.

It is desirable to upgrade available methane to methanol or higher oxygen atom containing hydrocarbons, such as alcohols, ethers, aldehydes, etc. Existing technologies for converting methane to methanol include destruction of methane to form a synthesis gas ($H_2$ and CO), followed by indirect liquefaction steps.

Production of alcohols and/or olefins by oxidation of organic compounds is difficult because the oxidation reaction tends toward completion to carbon dioxide. Overoxidation has been a persistent problem and arresting the oxidation at a desired intermediate oxidation product is a goal of much research.

However, conventional catalytic approaches to produce methanol from methane typically have poor conversion efficiencies, slow reaction rates, and are not economically competitive because they are typically very energy intensive. One such process, the oxidative coupling process, involves the use of an oxidant to abstract hydrogen from methane and coupling two or more hydrocarbon radicals to form light olefin, oxygenates, and other hydrocarbons. The oxidants are oxygen, halogens and reducible metal oxides as oxygen carriers and catalysts. In the oxidative coupling processes, hydrogen abstraction at the oxygen centers of the catalyst is typically the rate determining step, and catalyst properties are important for end product selectivity. Therefore, the maximum rate of product conversion strongly depends on the rate of radical formation on the active oxygen centers. In order to increase the rates, chemists have used high temperatures, even in excess of 900° C. However, this undesirably promotes deep oxidation of methane to fully oxidized species, such as $CO_2$. In another strategy, a high temperature dehydrogenation coupling process has a very high radical generation rate, and correspondingly a high rate of light olefin formation. However, the process is plagued by solid carbon formation which lowers the efficiency of the olefin production, and excess hydrogen is necessary to suppress the solid carbon formation.

One conventional method for the catalytic conversion of methane to methanol involves a first reaction with water to produce synthesis gas, which is a mixture of carbon monoxide and hydrogen, followed by catalytic conversion of the synthesis gas to methanol. A direct, one-step oxidation of methane to methanol would be simpler, and economically and environmentally preferable.

Therefore, there is a need for a process that produces methanol in a gas or liquid form. It would be desirable if the process was cost effective, easy to operate, relatively fast, and capable of achieving total mineralization.

SUMMARY OF THE INVENTION

The present invention combines a semiconductor material on a porous substrate with ultraviolet illumination (either from solar light or a ultraviolet lamp) and an efficient oxidant, such as electrochemically generated ozone ($O_3$), hydrogen peroxide ($H_2O_2$) or oxygen ($O_2$), in a method and apparatus for oxidation of organic contaminants. The invention includes a process and apparatus wherein efficient photocatalytic oxidation occurs in either a two-phase or three-phase boundary system formed in the pores of a semiconductor membrane such as, a $TiO_2$ membrane, disposed in a photocatalytic reactor.

The present invention also provides a process using the apparatus disclosed herein to convert methane to methanol. The process may use either water, oxidant, or an electron transfer molecule to aid in the conversion of methane to methanol. Methane, water, and/or oxidant may be present in the gas or liquid phase. The electron transfer molecule is always in aqueous solution.

In a first two-phase system, a contaminated gas stream (such as air) is passed over a solid, porous semiconductor photocatalyst and a gaseous oxidant (such as ozone, oxygen or a combination thereof) is provided to the porous photocatalyst. In a second two-phase system, a contaminated water stream is passed over a solid, porous semiconductor photocatalyst and a liquid oxidant (such as aqueous hydrogen peroxide) is provided to the porous photocatalyst. In either two-phase system, the oxidant and contaminant sources are delivered over opposing sides of the porous photocatalyst and contact each other adjacent the solid ultraviolet illuminated photocatalyst surface to provide oxidation of the contaminant. The photocatalyst described herein may have a metal catalyst deposited thereon. The metal catalyst can be a metal, metal alloy, metal oxide or a metal/metal oxide combination. The process and apparatus allow the use of sunlight or artificial light, such as inexpensive low power ultraviolet lamps, as the source of ultraviolet illumination directed onto the semiconductor photocatalyst surface.

In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein a meniscus forms a liquid phase that varies from the molecular diameter of water to that of a capillary tube resulting in a diffusion layer that is several orders of magnitude smaller than diffusion layers in the closest known reactors. Furthermore, generation of OH. radicals can be enhanced by photolysis of the oxidizer ($O_3$ or $H_2O_2$) by using ultraviolet lamps with a broader ultraviolet spectrum than that used in conventional AOPs.

With the small diffusion layer, the oxidant within the three-phase system simultaneously functions (i) as an electron acceptor at the surface of the semiconductor membrane in the photocatalytic oxidation of organic contaminants, and (ii) to photolyze the $O_3$ and/or $H_2O_2$ to produce OH. radicals if proper visible and/or ultraviolet illumination is used (i.e., wavelengths below 300 nm, preferably between about 220 and 280 nm). It is proposed that the metal catalyst in combination with the photocatalytic reactor enhances the reaction rate at the photocatalyst surface by providing additional sites for more efficient use of the photogenerated electron ($e^-$) and holes ($h^+$) for the reduction of the oxidant and oxidation of water for the formation of the OH. radicals. Different semiconductors have different band-gap energies (i.e., the energy between the valence band and the conduction band), the light used in the reactions needs to have an energy equal to or higher than the band gap energy to generate electrons ($e^-$) and holes ($h^+$) in the semiconductor. Thus, depending on the semiconductor used, the light needed to generate the electrons and holes may be visible and/or ultraviolet light.

The apparatus of the present invention may be used to for the conversion of methane to methanol in either a three phase or two phase system as described above, such that methane is provided to one surface of the porous semiconductor and reactants are supplied to the opposite surface of the porous semiconductor. The semiconductor photocatalyst can be selected from titanium dioxide, tungsten oxide, bismuth trioxide, ruthenium oxide, iron oxide, cadmium sulfide and mixtures thereof. Dopants may be added to the semiconductor photocatalyst in order to effect the electron transfer. Effective amounts of dopant range from between approximately 0.5 atom percent and 10 atom percent. Suitable dopants can be selected from titanium, vanadium, chromium, manganese, iron, cobalt, nickel, copper, zinc, ruthenium, lanthanum, lithium, silver and platinum. Synthesis of the semiconductor photocatalyst can be carried out as described in U.S. Pat. No. 5,720,858 to Noceti, of which the entire disclosure is incorporated by referenced herein.

The term reactant is meant to include water, oxygen, ozone, hydrogen peroxide, protons, and electron transfer molecules. Methane as well as the reactant can be in a gas form (except the electron transfer molecule) or dissolved in a liquid. The electron transfer molecule may be selected from 1,1'-dimethyl-4,4'-bipyridinium dichloride ($MV^+$), 1,4-dicyanobenze, p-dicyanobenzene, 1-cyanonaphthalene, 2,4,5-trinitrobenzene, hexamethylphosphoric triamide, and methyl vilogen dichloride hydrate.

The suggested reaction pathway for photochemically converting methane to methanol proposes the initial production of hydroxyl radical (OH.) through the photolysis of water. Then, the OH. radical reacts with a methane molecule to produce methyl radical. In the preferred reaction, the methyl radical then reacts with another water molecule to produce methanol and hydrogen:

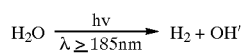

(1)

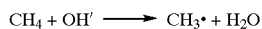

(2)

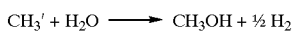

(3)

This reaction requires high energy visible and/or ultraviolet light and some extra energy to heat the reactants to an adequate temperature.

In a photocatalytic process, oxidation of methane can occur on a semiconductor surface using visible and near ultraviolet light. One possible reaction is:

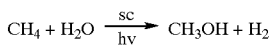

(4)

where hv represents photons with an energy equal to or higher than the band gap energy of the semiconductor (sc).

Under illumination, electrons ($e^-$) and holes ($h^+$) are generated in the space charge region of the semiconductor (sc):

$$sc + h\nu \rightarrow h^+_{VB} + e^-_{CB} \quad (5)$$

Under proper conditions, the photoexcited electrons (in the conduction band, CB, of the semiconductor) and photoexcited holes (in the valence band, VB, of the semiconductor) can be made available for redox reactions. The photogenerated holes in the VB must be sufficiently positive to carry out the oxidation of adsorbed $H_2O$ molecules to produce OH. radicals (the oxidative agent):

$$h^+_{VB} + H_2O \rightarrow OH. + H^+ \quad (6)$$

The photogenerated electron can react with an oxidant (e.g., oxygen) or an electron transfer molecule.

In most cases, the semiconductor can undergo oxidative decomposition by the photo-generated holes. It is generally found that only n-type semiconducting oxides are photostable towards photoanodic corrosion, although such oxides usually have band gaps which absorb only visible and/or ultraviolet light. Thus, a semiconductor suitable for the reaction in Equation (1) will be: (i) photoactive; (ii) able to use visible and/or near ultraviolet; (iii) biologically and chemically inert; (iv) photostable; and (vi) able to produce OH. radicals as in Equation (6).

$TiO_2$ and $SrTiO_3$ satisfy the energy demand for reactions (4) or (5) and (6). Among the different semiconductors tested, $TiO_2$ is the most efficient photocatalyst for the oxidation of organic contaminants. $TiO_2$ is effective not only in aqueous solution but also in non-aqueous solvents and in the gas phase. It is inexpensive, photostable, insoluble under most conditions, and non-toxic. Thus, $TiO_2$ has proven to be the semiconductor of choice for photomineralization of organic contaminants. However, several semiconductor may be used in the conversion of methane to methanol.

In some photocatalytic reactions in aqueous solution, it has been shown that $O_2$ reduction at the semiconductor surface is the rate determining step. This limitation can be overcome by the use of a porous semiconductor membrane, i.e., a "three phase" boundary system where the reactants are delivered to the reaction site as disclosed in co-pending U.S. patent application Ser. No. 08/791,599, filed Jan. 31, 1997, and incorporated by reference herein. In addition, enhancement of the photcatalytic reaction by assisting the oxidation/reduction reactions that take place.

Another approach for the photocatalytic oxidation of methane to methanol can be carried out in the liquid phase, in the presence of electron transfer molecules. The following mechanism has been proposed in the presence of an electron transfer molecule (e.g., 1,1'-dimethyl-4,4'-bipyridinium dichloride, $MV^{+2}$). Here the photogenerated electron usually reacts with the electron transfer molecule $MV^{+2}$:

$$e^-_{CB} + MV^{+2} \rightarrow MV^{+} \qquad (7)$$

Then, combined with the process occurring with the photogenerated holes (Equation 6):

$$MV^{+} + H^{+} \rightarrow \frac{1}{2}H_2 + MV^{+2} \qquad (8)$$

$$CH_4 + OH \cdot \rightarrow CH_3 \cdot + H_2O \qquad (9)$$

$$CH_3 \cdot + H_2O \rightarrow CH_3OH + \frac{1}{2}H_2 \qquad (10)$$

This approach requires the dissolution of methane in the aqueous solution. However, solubility of methane at room temperature in aqueous solution is extremely low. Thus, this approach is limited by (i) the solubility of methane in water, (ii) the diffusion of methane from the bulk of the solution to the reactive sites, (iii) the diffusion of methanol from the reactive sites to the bulk of the solution; (iv) the ability to separate methanol from the electron transfer ions (e.g., $MV^{+2}$) in solution; and (iv) the ability to avoid the continuous exposure of methanol to the photocatalytic sites, which could result in the subsequent oxidation of the alcohol to, e.g., formic acid, CO and $CO_2$. These limitations are overcome when a two or three phase boundary system is used because methane and reactants are delivered directly to the photocatalytic sites.

The present invention provides a process that includes providing methane over a photocatalyst disposed on a first surface of a porous substrate having pores therethrough to a second surface; providing a reactant to the second surface and through the pores of the substrate into contact with the photocatalyst on the first surface; and exposing the photocatalyst to visible and/or ultraviolet light. This process can be used to convert methane to methanol as described herein. The photocatalyst can be titanium dioxide, tungsten oxide, bismuth trioxide, ruthenium oxide, iron oxide, cadmium sulfide and mixtures thereof. Alternatively, the photocatalyst can be a titanium dioxide based binary oxide. Depending on the photocatalyst used, the light required to energize the photocatalyst may be in the visible (over 400 nm) or ultraviolet (200–400 nm). The reactant may contain an oxidant selected from oxygen, ozone, hydrogen peroxide and combinations thereof, protons, or an electron transfer molecule.

Methane flows through a fluid cell adjacent the first surface, where the fluid cell has a ultraviolet transmission surface positioned to expose the photocatalyst, a fluid inlet, and a fluid outlet. The reactant flows through a reactant cell adjacent the second surface, where the reactant cell has a reactant inlet. Methane and/or the reactants can be in the gaseous or liquid state.

The visible and/or ultraviolet light may be provided from an ultraviolet lamp which includes the ultraviolet wavelength range of 300–400 nm, preferably 300–370 nm. A two-phase or three-phase interface is provided between the solid photocatalyst, methane and the reactant; and methane is converted at the interface to produce methanol and depending on the reactant, hydrogen.

The process may be employed with a photocatalyst that has a metal catalyst disposed thereon. The photocatalyst and metal catalyst disclosed above, are used in a three phase or two phase boundary system to convert methane to methanol. The photocatalyst may also be doped as discussed above.

In addition, a process for converting methane to methanol is disclosed where methane is provided over a photocatalyst having pores therethrough. A reactant is provided to the pores of the photocatalyst into contact with methane and the photocatalyst is exposed to visible and/or ultraviolet light. The photocatalyst may be supported by a support structure such as a composite mixture of photocatalyst and another material to provide a porous support for the photocatalyst, a mesh structure or porous ceramic support member. The organic contaminants discussed above may be provided over the photocatalyst and oxidized using this process as well.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
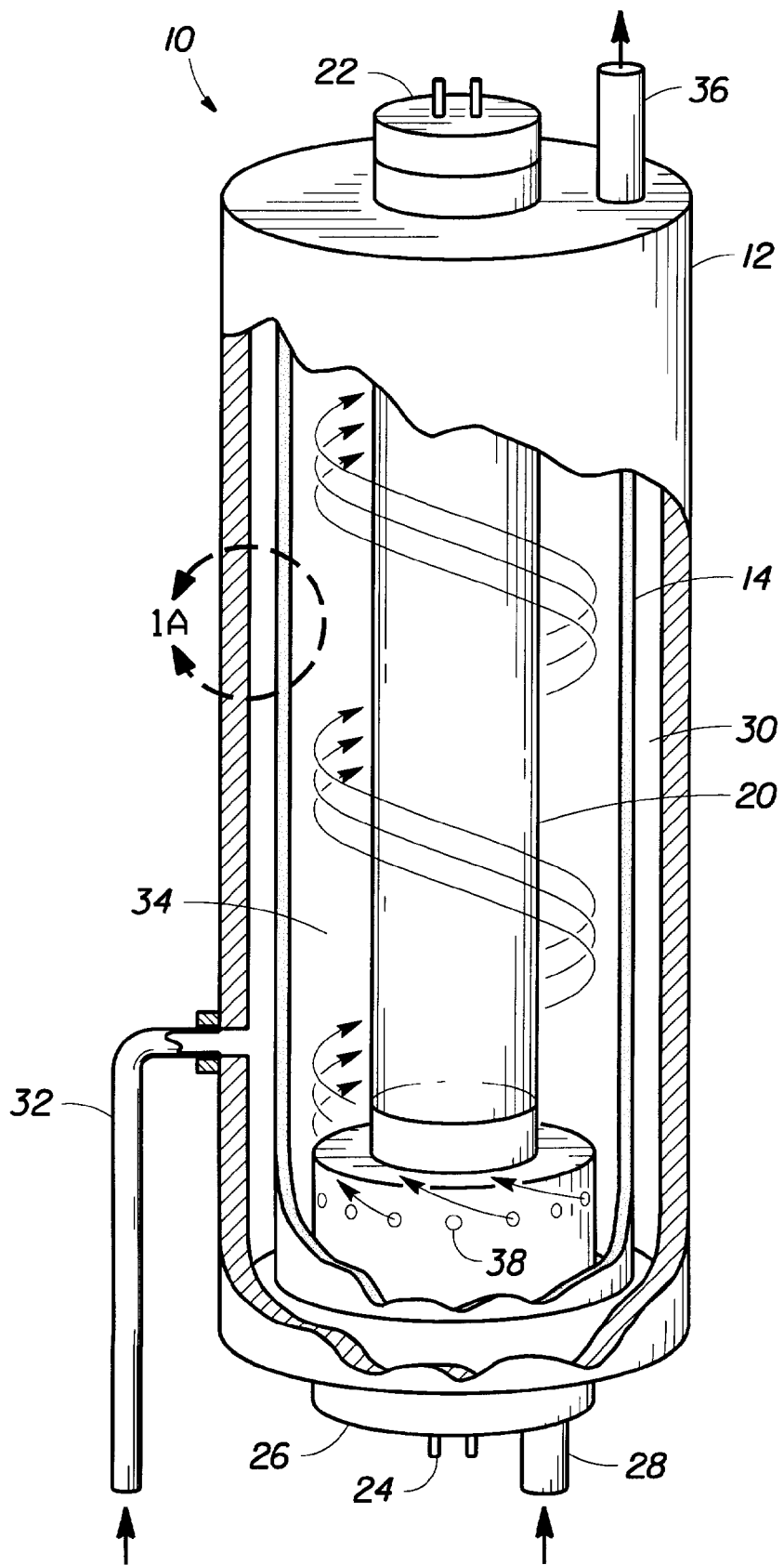
FIG. 1 is a schematic diagram of a photocatalytic reactor which combines visible and/or ultraviolet light, reactant, and a semiconductor membrane in a three-phase reaction zone.

One embodiment of the present invention provides a process and apparatus wherein efficient photocatalytic oxidation of organic compounds or conversion of methane to methanol occurs in a unique two-phase or three-phase reaction zone formed in the pores of a substrate having a porous photocatalytic surface. The photocatalytic surface may be a semiconductor such as, $TiO_2$ or a binary oxide selected from $TiO_2/SiO_2$, $TiO_2/ZrO_2$, $TiO_2/SnO_2$, $TiO_2/WO_3$, $TiO_2/MoO_3$ and mixtures thereof. A metal catalyst may be disposed on the surface of the semiconductor, such as a metal, a metal oxide, or a metal alloy, for example, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, Pt—Ni—Ta, Pt—$RuO_2$, $SnO_2$, $W_2O_3$, $IrO_2$, $RhO_2$ and mixtures thereof.

The apparatus of the invention oxidizes organic contaminants by combining a porous semiconductor photocatalyst surface which may have a metal catalyst disposed thereon, an oxidant source and a visible and/or ultraviolet source directed onto the photocatalyst surface. The photocatalyst preferably includes from about 0.01 wt % to about 5 wt % metal catalyst. The fluid (liquid or gas) containing organic contaminants is delivered over a first side of the porous substrate having a photocatalytic surface and the oxidant (liquid or gas) is delivered through a second side of the porous substrate to the first side of the photocatalyst surface where it contacts the contaminated fluid.

The porous photocatalyst surface is preferably a porous titanium dioxide layer or surface formed on a porous substrate. The substrate may be made from virtually any material that is sufficiently porous to pass an oxidant therethrough and can provide physical support for the photocatalyst material. For example, the substrate could be made from a porous metal, porous carbon or graphite, a sintered porous glass or a porous ceramic. The photocatalyst may be applied to the porous substrate by any means including: (1) applying a solution or slurry with a brush followed by sintering; (2) forming a sol-gel, applying the sol-gel by spraying, dipping, or spin coating, then drying and curing; (3) vacuum deposition processes, such as chemical vapor deposition and physical vapor deposition; or (4) electrochemical oxidation of a porous metal in an acid solution. The term porous as used in reference to the photocatalyst surface is intended to include any photocatalyst surface having passages therethrough for the oxidant. Therefore, the photocatalyst layer itself may be porous or, conversely, the photocatalyst may be a dense layer that simply leaves the pores of the substrate open. Theoretically, if the photocatalyst had sufficient strength and appropriate pore size, the porous substrate would not be necessary. The metal catalyst may be applied to the photocatalyst surface by any number of deposition techniques such as photodeposition, photoelectrodeposition, electrodeposition, electroless deposition, chemical vapor deposition, physical vapor deposition, or deeping and annealing.

The contaminated fluid is delivered over the photocatalyst surface through a fluid compartment or cell adjacent the porous photocatalyst surface, wherein the fluid compartment or cell comprises a fluid inlet, a fluid outlet and a ultraviolet transmission surface positioned to expose the porous photocatalyst surface. The oxidant is delivered to the second side of the porous substrate through an oxidant compartment or cell adjacent the porous substrate, wherein the oxidant cell comprises an oxidant inlet. In order to operate the apparatus, an oxidant source is connected to the oxidant inlet, and an organic contaminant source (such as water or air containing organic compounds) is connected to the fluid inlet. During operation, a ultraviolet source provides ultraviolet light through the ultraviolet transmission surface and onto the porous photocatalyst surface.

In one aspect of the invention, methods are provided for oxidizing organics in two-phase systems. A first two-phase system is provided in which a contaminated gas stream (such as air) is passed over a solid, porous semiconductor photocatalyst and a gaseous oxidant (such as ozone, oxygen or a combination thereof) is provided to the porous photocatalyst. In a second two-phase system, a contaminated water stream is passed over a solid, porous semiconductor photocatalyst and a liquid oxidant (such as aqueous hydrogen peroxide) is provided to the porous photocatalyst. In either two-phase system, the oxidant and contaminant sources are delivered over opposing sides of the porous photocatalyst and contact each other adjacent the solid ultraviolet illuminated photocatalyst surface to provide oxidation of the organic contaminants.

In another aspect of the invention, methods are provided for oxidizing organics in three-phase systems. In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein the meniscus of the liquid phase varies from the molecular diameter of water to that of a capillary tube resulting in a diffusion layer that is several orders of magnitude smaller than diffusion layers in the closest known reactors. The gaseous oxidant source preferably provides ozone. The preferred source of ozone is an electrolytic cell which generates an oxidant stream comprising from about 10% to about 18%, or greater, by weight of ozone. Such electrolytic cells, including depolarizing electrolytic cells, are described in U.S. Pat. No. 5,460,705 which description is incorporated by reference herein. A fully self-controlled electrolytic cell is most preferred for use at remote locations such as a groundwater treatment facility.

The ultraviolet source is preferably sunlight which enables a low cost apparatus that mineralizes low concentrations of organics in water, such as process water or groundwater, or in air. The ultraviolet source can also be an inexpensive low power ultraviolet lamp and the ultraviolet transmission surface of the fluid cell can be a ultraviolet transmission surface of the ultraviolet lamp. In addition, the ultraviolet source can also be a ultraviolet lamp with a broader ultraviolet spectrum, as used in conventional AOPs, and the ultraviolet transmission surface of the fluid cell can be a ultraviolet transmission surface of the ultraviolet lamp. It is also possible to transmit or deliver the ultraviolet light to the photocatalyst through various means or conduits, such as a fiber optic cable.

In a preferred embodiment, the invention provides an apparatus for oxidizing organic contaminants, comprising a porous substrate having a porous photocatalyst surface; a fluid cell adjacent the porous photocatalyst surface, the fluid cell comprising a ultraviolet transmission surface positioned to expose the porous photocatalyst surface, a fluid inlet and a fluid outlet; and an oxidant cell adjacent the porous substrate, the oxidant cell comprising an oxidant inlet.

The three phase boundary system described above can be used to convert methane to methanol in the presence of an electron transfer molecule in accordance with Equations (7)–(10). The photocatalyst used for the conversion of methane to methanol can be a semiconductor such as, titanium dioxide, tungsten oxide, bismuth trioxide, ruthenium oxide, iron oxide, cadmium sulfide and mixtures thereof. The conversion of methane to methanol is not limited to a titanium dioxide semiconductor. Most of the problems encountered in a photocatalytic system using an aqueous methane solution can be overcome in a "three phase" boundary system, where methane gas can be directly delivered to the photocatalytic reaction sites from one side and the electron transfer molecule plus protons are delivered to the photocatalyst from the opposite side. The three phase boundary overcomes low solubility and slow diffusion of methane in water. Also, combined with a proper reactor design, such as an annular reactor with impinging jets for delivery of the reactant (electron transfer molecule), the contact time between methane solution and the photocatalytic sites can be controlled. Controlling the contact time is important in that it avoids repeated exposure of methanol to the active sites, thereby reducing unfavorable reactions such as the reduction of methanol to formic acid, CO, or $CO_2$. By using an appropriate metal catalyst on the semiconductor surface, the reduction of protons can take place directly on the semiconductor surface, eliminating the use of electron transfer molecules.

In another embodiment, an oxidant such as oxygen or ozone may be used in a two or three phase system to convert methane to methanol. Ozone reduction potential (electrochemical potential is 2.08 V at pH=0) is more favorable than the oxygen reduction potential of $O_2$ (1.23 V at pH 0). Further, the solubility of $O_3$ in aqueous solution is an order of magnitude higher than the solubility of $O_2$ (490 g/l vs 48.9 g/l at just above 0° C.). The wavelength range of the light between 300–400 nm (preferably between 300 and 370 nm) would not promote direct photolysis of either ozone or oxygen. The homogeneous reaction between ozone and methane may occur. However, it is expected that this reaction will be much slower than the oxidation of methane by the OH. radicals generated in the photocatalytic process on the semiconductor surface.

Oxygen is readily available, and can be delivered directly to the photocatalytic sites by the use of the three phase boundary system. On a semiconductor surface, the oxygen reduction reaction is as follows:

$$e^-_{CB} + O_2 \rightarrow O_2^- \quad (11)$$

$O_2^-$ could react with $CH_3.$:

$$O_2^- + CH_3. \rightarrow CH_2O + OH^- \quad (12)$$

Alternatively, in the absence of oxygen, the reduction of protons can take place if an appropriate semiconductor is used (e.g., $TiO_2$ and $SrTiO_3$.):

$$e^-_{CB} + H^+ \rightarrow \tfrac{1}{2}H_2 \quad (13)$$

The reaction in Eq. (13) can be enhanced by using a mild acid such as sulfuric acid, as a $H^+$ donor to generate $H_2$ along with methanol, both of which are commercially useful end products. In addition, the reaction in Eq. (13) can be enhanced by the use of a metal catalyst on the semiconductor surface, such as those described above, for hydrogen evolution.

A two phase system may be used to convert methane to methanol where methane and the reactants are in the gas phase. A gas oxidant, such as humidified oxygen, ozone or air, is delivered to one side of the photocatalytic reaction sites, while methane gas is simultaneously delivered to the other side of the photocatalyst. Alternatively, oxygen may be delivered with the methane to the photocatalytic sites and reactant delivered to the opposite side. Maintaining both the reactor and the humidified air at a temperature above the boiling point of methanol at a given pressure, humidified methanol can be removed from the reactor in the gas phase. On the other hand, if the temperature of the reactor is lower than the boiling point of methanol at a given pressure, methanol can be separated in the liquid phase. Conventional separation techniques as described in U.S. Pat. No. 5,720,858 may be used.

In the following description of the drawings, the reactor may be used to oxidize organic contaminants or convert methane to methanol. In the case where methane is in the fluid cell, methane is converted to methanol by a reactant delivered to the opposite side of the photocatalyst supported by a porous membrane. The reactant can be an oxidant, water, water mixed with protons, or water mixed with an electron transfer molecule. With the exception of the electron transfer molecule, these reactants may be in the gas or liquid phase when delivered to the photocatalyst. Likewise, methane may be in a liquid or gas phase.

FIG. 1 is a schematic diagram of a photocatalytic reactor 10 which utilizes visible and/or ultraviolet light, oxidant, and a semiconductor membrane in a three-phase reaction zone to efficiently mineralize organic contaminants in water, such as process water, polishing water systems, contaminated groundwater or potable water. This reactor may also be used to convert methane to methanol using visible and/or ultraviolet light, a reactant and the semiconductor membrane in a three-phase reaction zone. This reactor uses an inexpensive low power ultraviolet lamp 20 to supply visible and/or ultraviolet light to mineralize the organic contaminants or methane. The photocatalytic reactor 10 also includes an impermeable outer cylinder 12 of any suitable material and a permeable inner cylinder 14 which comprises a porous substrate material 16 (See FIG. 1A) that is coated on the inside with a porous photocatalyst surface 18 having an optional metal catalyst 19 disposed thereon. The porous substrate material 16 and the porous photocatalyst surface 18 may be produced by a method described in U.S. Pat. No. 5,137,607, column 3, line 58, to column 4, line 55, which description is incorporated by reference herein. A ultraviolet lamp 20 is mounted at a first end 22 through the outer cylinder 12 and at a second end 24 through a fluid jet 26 which is mounted through the outer cylinder 12 and has a fluid inlet 28.

The inner cylinder 14 is mounted within the outer cylinder 12 to form an annular oxidant cell 30 having an oxidant inlet 32, which may also serve as a water inlet. When organic contaminants are being oxidized, the oxidant cell 30 does not have a similar oxidant outlet since oxidants introduced into the oxidant cell 30 pass through the porous material 16 which is adjacent the oxidant cell 30. The oxidants further pass through the porous photocatalyst surface 18 which is adjacent a fluid cell 34. The fluid cell comprises the fluid inlet 28, the fluid jet 26 which directs the fluid toward the porous photocatalyst surface 18, and a fluid outlet 36. The fluid jet 26 preferably has a plurality of centrifugal jets 38 drilled obliquely through the fluid jet 26 for directing the fluid toward the porous photocatalyst surface 18.

Figure 2:
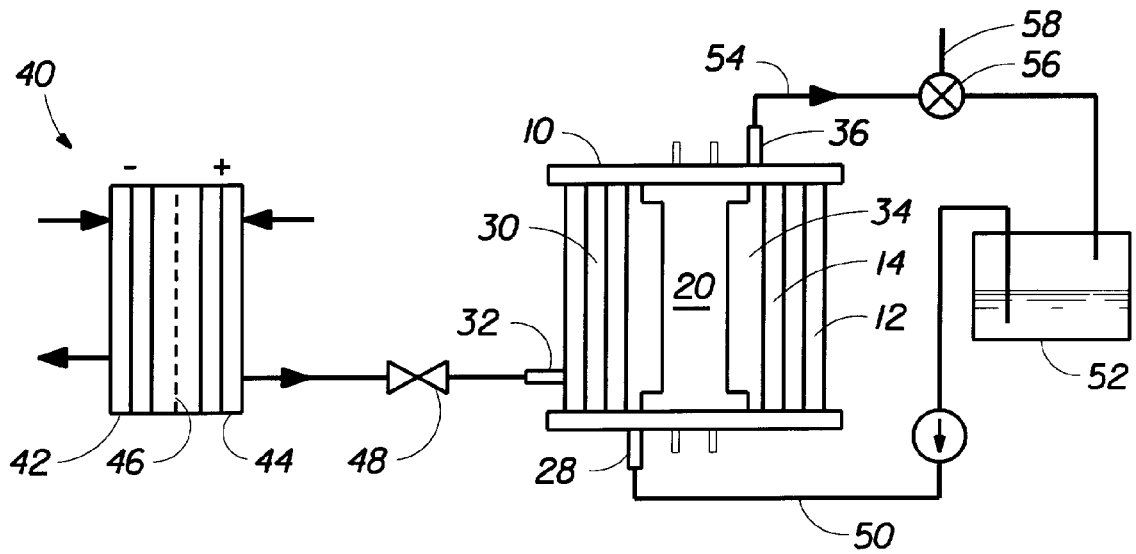
FIG. 2 is a schematic diagram of the photocatalytic reactor of FIG. 1 connected to a depolarized oxidant source and a water reservoir.

FIG. 2 is a schematic diagram of the photocatalytic reactor of FIG. 1 connected to an oxidant source and a water reservoir. The oxidant inlet 32 is connected to the oxidant source 40 which is preferably a depolarized electrolytic cell having a cathode 42, an anode 44, and optionally a proton exchange membrane 46 to convert water to an oxygen stream having greater than about 10% by weight of ozone. The depolarizing electrolytic cell is described in U.S. Pat. No. 5,460,705 which description is incorporated by reference herein. A gas pressure regulator 48 controls the delivery of ozone gas to the photocatalytic reactor 10.

The fluid inlet 28 is connected by pipes or tubing 50 to a reservoir containing the organic contaminants or methane such as a storage tank 52. For a small fluid cell 34, the fluid outlet 36 may return the fluid to the storage tank 52 for recycling using pipes or tubing 54. A valve 56 diverts the fluid to a discharge pipe or tube 58 for analysis of the remaining amount of the organic contaminants or methane. The performance of the photocatalytic reactor 10 may be checked by performing liquid chromatography or gas chromatography on an effluent sample. In order to mineralize a given amount of the organic contaminants or methane in a single pass through the photocatalytic reactor 10, the size of the reactor can be increased or a plurality of small reactors can be connected in series or in parallel.

Figure 1A:
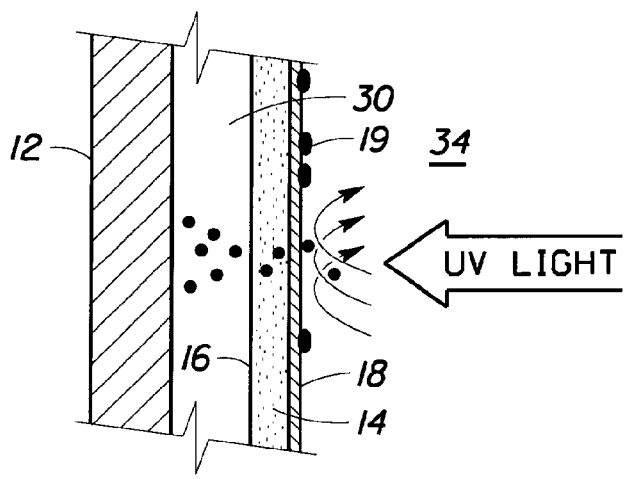
FIG. 1A is a schematic diagram of a section of the reactor of FIG. 1 showing details of the reaction zone.

FIG. 1A is a schematic diagram of a section of the photocatalytic reactor 10 of FIG. 1 showing details of the reaction zone. The reactor 10 is constructed with a porous surface 18 having an optional metal catalyst 19 disposed thereon, on a porous substrate 16. An oxidant, such as ozone gas, or water feeds through the porous substrate and finally into contact with the porous surface 18 where oxidation of the organic contaminants or conversion of methane occurs in a three-phase reaction zone shown in FIG. 3.

Figure 3:
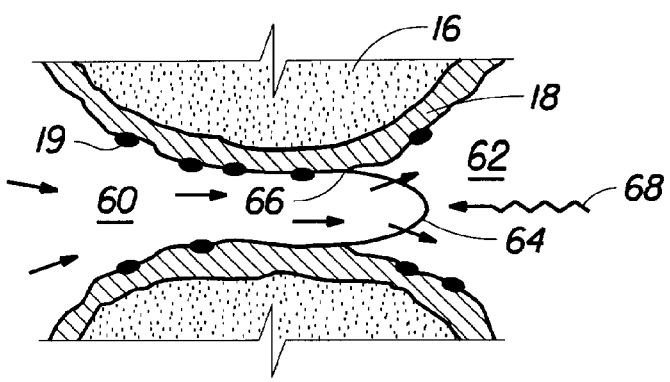
FIG. 3 is a schematic diagram of a pore in the semiconductor membrane of the reactor of FIG. 1.

FIG. 3 is a schematic diagram of a single pore in the semiconductor membrane of the reactor of FIG. 1 being used in a three-phase system. At some distance within the pores of the porous surface 18 and the metal catalyst 19, a gas region 60 diffuses into a fluid region 62 with a boundary layer 64 that contacts the surface 18 at a three-phase interface 66. Visible and/or ultraviolet light 68 joins the oxidant or water and organic contaminants or methane at the interface 66 and allows the photocatalytic oxidation because of the local production of hydroxyl radicals. Where the oxidant is ozone, excess ozone may diffuse into the fluid and can be photolyzed by the ultraviolet light if a ultraviolet lamp with a broad ultraviolet spectrum (including wave lengths lower than 300 nm, preferably from 220 to 280 nm) is used, thus generating additional OH. radicals for non-catalyzed oxidation of the organic contaminants or methane. The metal catalyst may assist in the reduction of oxygen, by assisting in the e-transfer reaction.

Figure 4:
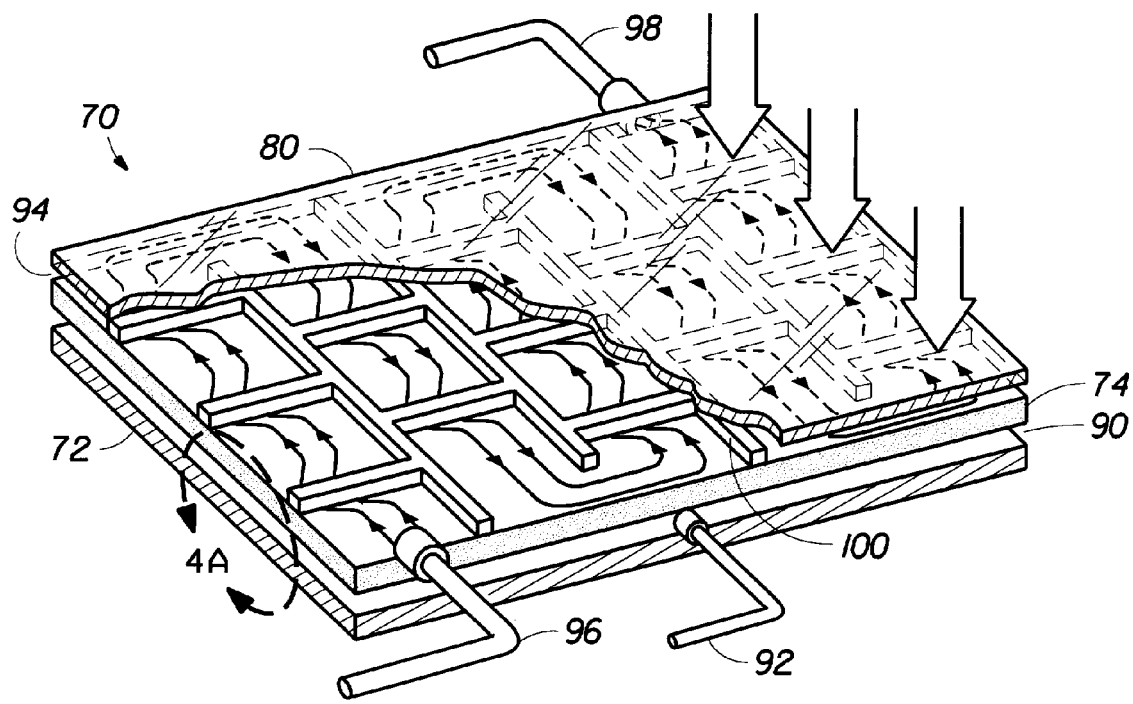
FIG. 4 is a schematic diagram of a photocatalytic reactor panel which combines solar visible and/or ultraviolet light, oxidant, and a semiconductor membrane in a three-phase reaction zone.

FIG. 4 is a schematic diagram of a photocatalytic reactor panel 70 which combines solar light, oxidant, and a semiconductor membrane in either a two-phase or three-phase reaction zone to efficiently mineralize the organic contaminants in water, such as process water, contaminated groundwater, polishing water systems, potable water, or in air, or for the conversion of methane to methanol. The photocatalytic reactor panels (shown with sidewalls removed) have the form of solar panels to obtain visible and/or ultraviolet light from the sun. An array of the panels can be positioned in series or parallel as desired to oxidize the organic contaminants or convert methane to methanol. The photocatalytic reactor panel 70 has an impermeable bottom 72 of any suitable material and a permeable center 74 which comprises a porous substrate material 76 that is coated on the top with a porous photocatalyst surface 78. The porous substrate material 76 and the porous photocatalyst surface 78 may be produced by a method described in U.S. Pat. No. 5,137,607, column 3, line 58, to column 4, line 55, which description is incorporated by reference herein. A ultraviolet transmission surface 80 covers the reactor and is positioned to expose the porous photocatalyst surface 78 to sunlight.

Figure 4A:
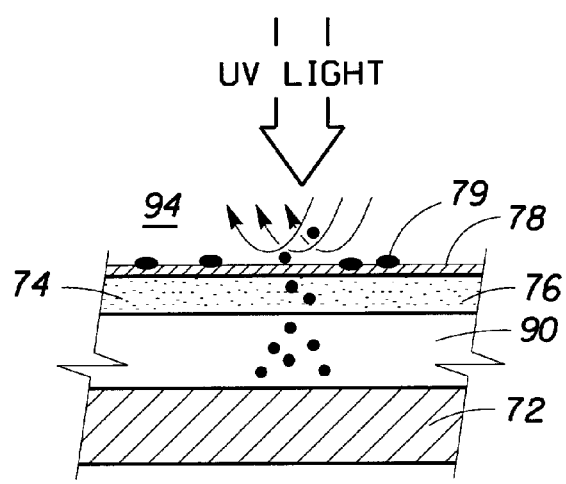
FIG. 4A is a schematic diagram of a section of the reactor of FIG. 4 showing details of the reaction zone.

FIG. 4A is a schematic diagram of a partial cross-section of the reactor of FIG. 4 showing details of the reaction zone. The porous substrate material 76 is adjacent an oxidant cell 90 having an oxidant inlet 92 that may also be used as a water inlet. The oxidant cell 90 does not typically need to have a similar oxidant outlet since oxidants introduced into the oxidant cell 90 pass through the porous substrate material 76 which forms a wall of the oxidant cell 90. The oxidant further passes into contact with the porous photocatalyst surface 78 which is adjacent a fluid cell 94 and contacts metal catalyst 79 disposed thereon. The fluid cell 94 has a fluid inlet 96 and a fluid outlet 98. The fluid cell 94 has a baffle 100 which directs a fluid through the panel from the fluid inlet 96 to the fluid outlet 98 and toward the porous catalyst surface 78.

Figure 5:
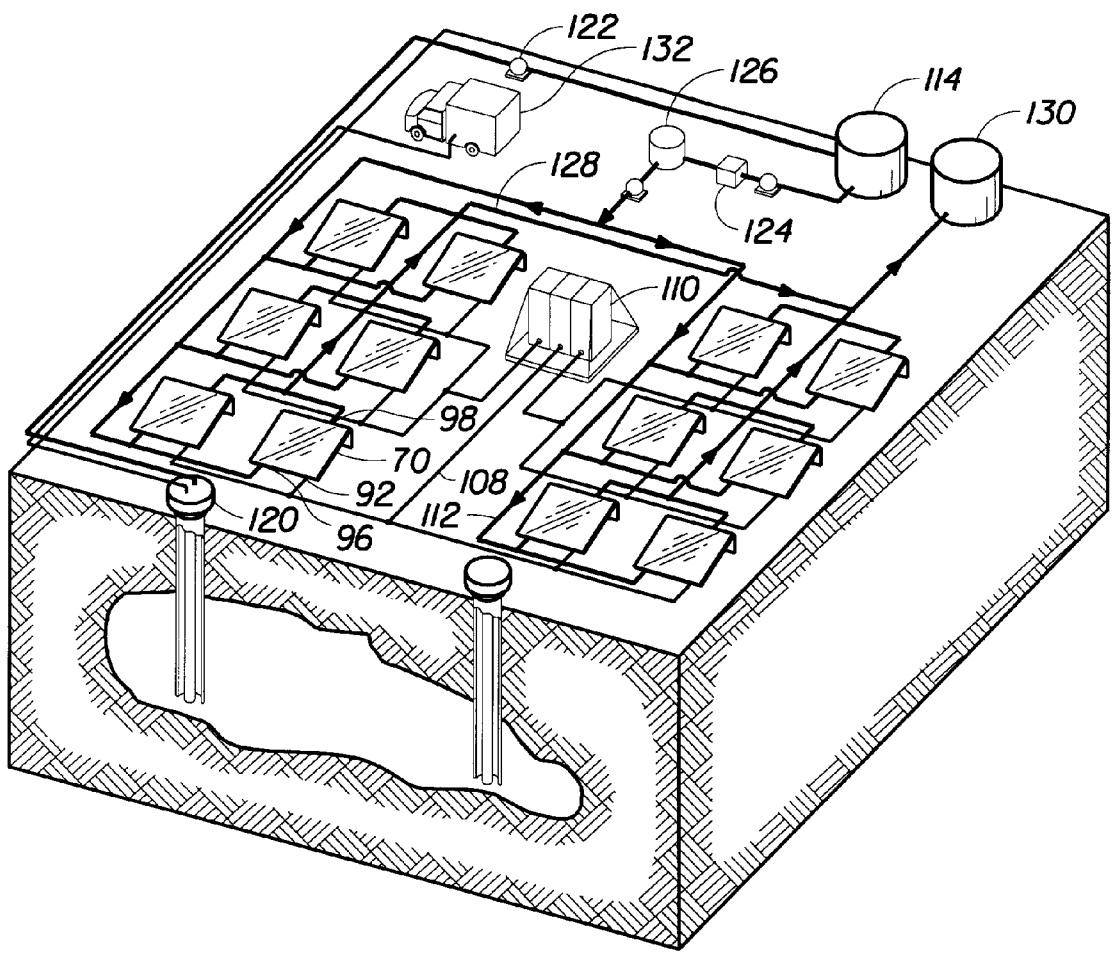
FIG. 5 is a schematic diagram of an array of the photocatalytic reactor panels of FIG. 4 connected in parallel to a portable oxidant source and a groundwater treatment system.

FIG. 5 is a schematic diagram of an array of the photocatalytic reactor panels 70 of FIG. 4 connected in parallel to a portable oxidant source 110 and a groundwater treatment system. The oxidant inlets 92 on an array of reactor panels 70 are preferably connected in parallel by oxidant lines 108 to an oxidant source 110. The oxidant source is preferably an array of electrolytic cells which convert water to an oxygen stream having from about 10% to about 18 (or greater) by weight of ozone.

The fluid inlets 96 on the array of reactor panels 70 are connected in parallel by pipes 112 to a source of organic contaminants or methane such as a storage tank 114. The organic contaminants such as, contaminated groundwater, or methane from a source of natural gas can be collected from one or more extraction wells 120 by a pump 122. A filter system 124 and a pH adjustment tank 126 will typically be required for treatment of the groundwater prior to oxidation of the organic contaminants or methane. The fluid outlets 98 on the array of reactor panels 70 are connected in parallel by pipes 128 to a storage tank 130 which holds treated water for re-injection or further treatment. The reactor panels 70 can be located at a remote site using mobile electronic equipment and power supplies 132.

Figure 6:
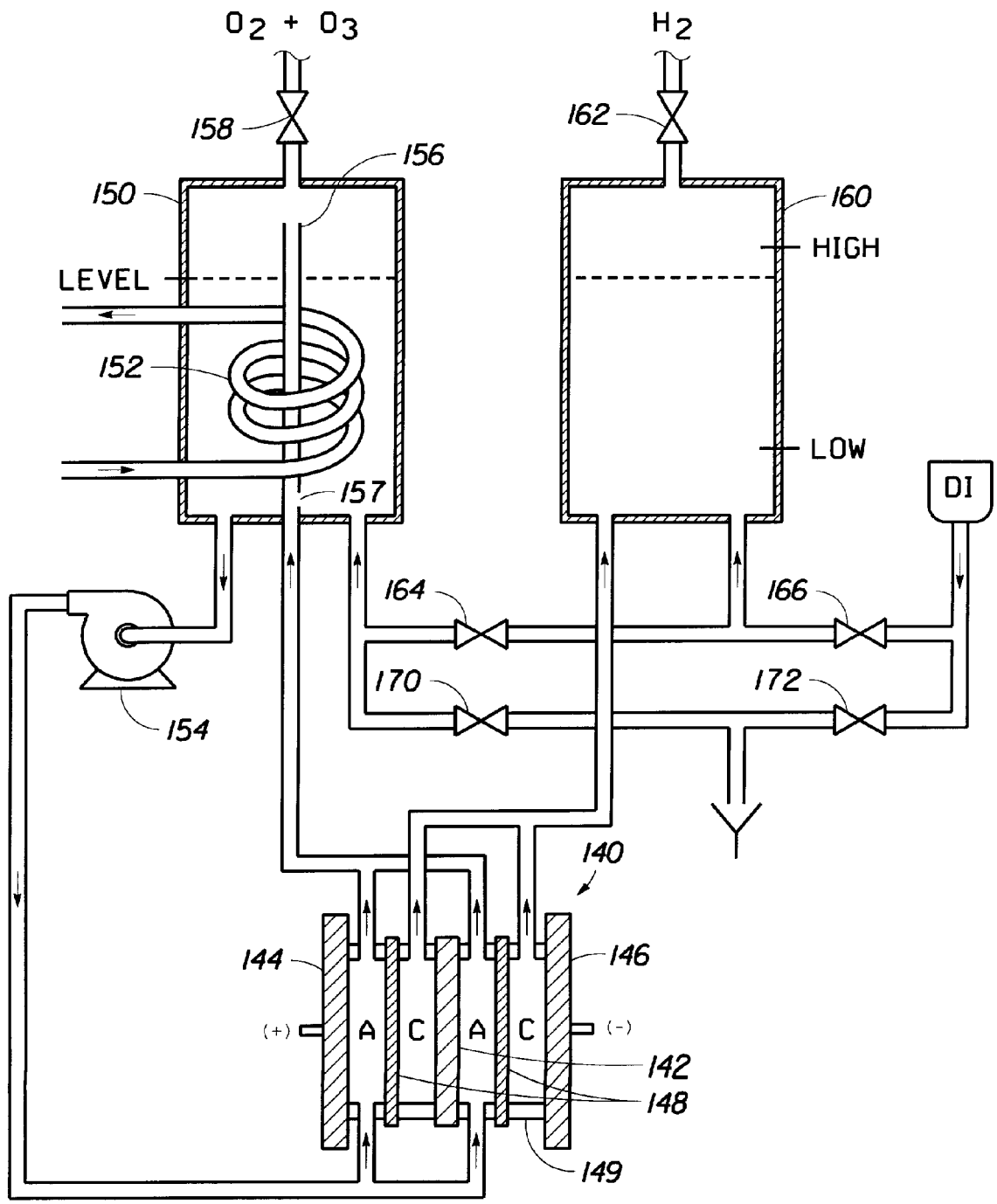
FIG. 6 is a schematic diagram of an ozone source having electrolytic cells for producing ozone under pressure.

FIG. 6 is a schematic diagram of a self controlled ozone source 110 having electrolytic cells for producing ozone under pressure. The electrolytic cells are illustrated having an array of electrolytic cells (two shown) 140, separated by a bipolar plate 142, that are sandwiched between a positive end plate 144 and a negative end plate 146. Each of the individual cells have an anode and anode flowfield A as well as a cathode and cathode flowfield C separated by a proton exchange membrane 148 as described in U.S. Pat. No. 5,460,705, which description is incorporated by reference herein. The anode is preferably made from sintered porous titanium coated with lead dioxide and the cathode is preferably pressed carbon fibers or porous carbon having platinum electroplated on both sides to act as an electrocatalyst for hydrogen evolution. Note that fluid flow is shown as passing through non-conductive cell walls 149 for simplicity, although fluids preferably pass through openings in the end plates 144, 146, bipolar plates 142, and proton exchange membranes 148 as described in the >705 patent. Another ozone source that has shown good results is describe in pending application Ser. No. 08/829,604, which description is incorporated by reference herein.

An anode reservoir 150 holds deionized water which is cooled by coils 152 and recirculated by a pump 154 through the anode cells A. The anode reservoir 150 serves as a liquid/gas separator wherein oxygen and ozone generated in the anode cells A diffuse from the deionized water in a stand pipe 156 and collect at the top of the reservoir 150. A small hole 157 near the bottom of the stand pipe 156 allows the water level to drop in the stand pipe 156 when the anode pump is off and the ozone generator is in a low flow idle mode so that water will continue to circulate from the anodes and the anode reservoir due to thermal convection. The small hole 157 does not interfere with flow of the water and gases up the stand pipe 156 during normal operation. An ozone pressure control valve 158 controls the flow of gases from the top of the reservoir 150 in co-operation with information from various system monitors including a liquid level indicator.

A cathode reservoir 160 holds deionized water and the cathode recovery water which rises from the cathode cells C.

The cathode reservoir also serves as a liquid-gas separator wherein hydrogen generated in the cathode cells C collects at the top of the reservoir 160. A hydrogen control valve 162 controls the flow of hydrogen gases from the top of the reservoir 160 in co-operation with various system monitors including high/low liquid level indicators.

The anode reservoir 150 and the cathode reservoir 160 are connected to a source of deionized water (DI) with tubing that includes a first shut-off valve 166 and a second shut-off valve 164. A drain loop having a third shut-off valve 170 and a fourth shut-off valve 172 bypasses the first and second shut-off valves 166, 164 for flushing or draining the system.

Figure 7:
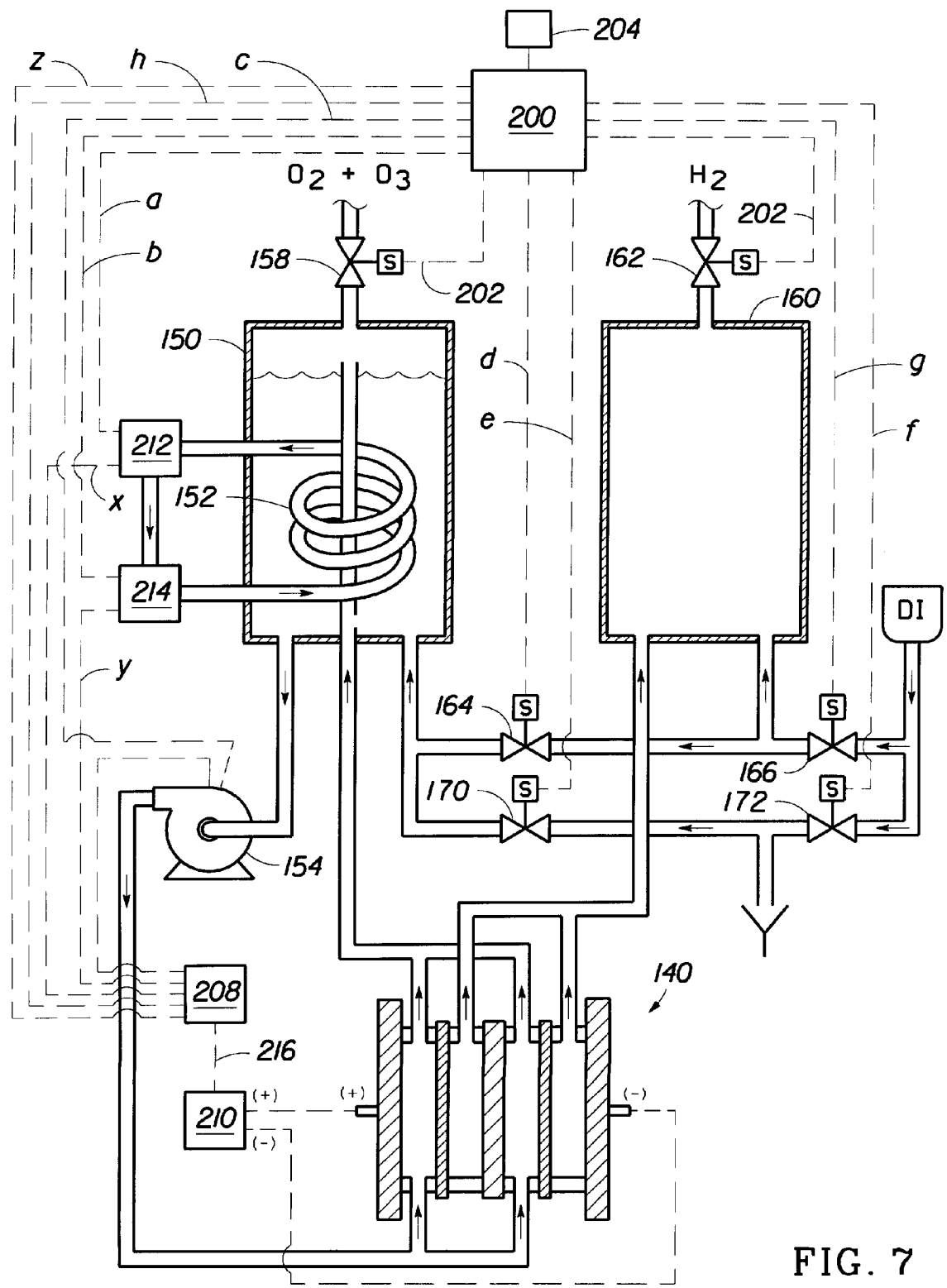
FIG. 7 is a schematic diagram of the ozone source of FIG. 6 included in a self-controlled apparatus which operates with sources of electricity and distilled water.

FIG. 7 is a schematic diagram of the ozone source 110 of FIG. 6 included in a self-controlled apparatus which operates with sources of electricity and distilled water. The array of electrolytic cells 140, the anode reservoir 150, and the cathode reservoir 160 are combined in an ozone generator which is self-controlled by a system controller 200 over control lines 202, a–h. The ozone generator 110 includes a pump, a refrigerant compressor and control valves that are controlled by the system controller 200 which executes system control software stored in a memory 204.

The ozone generator 110 further includes a power supply unit 208 and a power converter 210 for converting AC current to DC current for operation of the array of electrolytic cells 140. A condenser 212 and a compressor 214 are also included for operating the cooling coil 152 in the anode reservoir 150. All components include analog assemblies which are controlled by the system controller 200. Furthermore, all electrical components are powered by the power supply unit 208 by power lines 216, x–z.

The process steps discussed below can be implemented using a computer program that runs on, for example, the system controller 200. The computer program code can be written in any conventional computer readable programming language, such as Labview 50 available from National Instruments.

The invention includes a process for oxidizing a organic contaminants or methane in a fluid such as water or air, comprising the steps of flowing a fluid containing a organic contaminants or methane over a porous photocatalyst surface, flowing oxidant (such as oxygen, ozone or $H_2O_2$) through the porous photocatalyst surface into the flowing fluid, and exposing the photocatalyst surface to visible and/or ultraviolet light. Preferably, the fluid flows through a fluid cell adjacent the porous photocatalyst surface, the fluid cell comprising a ultraviolet transmission surface positioned to expose the porous photocatalyst surface, a fluid inlet, and a fluid outlet. The oxidant flows through an oxidant cell adjacent the porous substrate material, the oxidant cell has an oxidant inlet.

During semiconductor photocatalysis, under illumination, electrons ($e^-$) and holes ($h^+$) are generated in the space charge region of the semiconductor. Under proper conditions, the photo-excited electrons (in the conduction band (CB) of the semiconductor) and photo-excited holes (in the valence band (VB) of the semiconductor) can be made available for oxidation-reduction reactions. The photo-generated holes in the VB must be sufficiently positive to carry out the oxidation of adsorbed $OH^-$ ions or $H_2O$ molecules to produce OH. radicals (the oxidative agents in the oxidation of organic pollutants or methane). The photo-generated electron usually reacts with oxygen or any other oxidant. The metal catalyst on the semiconductor surface, is believed to enhance either or both the electron and hole transfer reactions.

The method and apparatus of the invention enables feeding the oxidant (e.g., $O_3$, $H_2O_2$, $O_2$ or combinations thereof) through a porous substrate directly to the semiconductor having an metal catalyst/organic contaminants or methane/oxidant interface. This technique increases the concentration of oxidant at the reaction sites on the surface of the photocatalyst, increasing the heterogeneous reaction rate by several orders of magnitude. In addition, the energy requirements for the reduction reaction in the photocatalyst system can be decreased by the use of $O_3$ or $H_2O_2$ instead of only $O_2$.

Electrochemical ozone generation provides an oxygen/ozone stream that is highly concentrated with $O_3$, typically between about 10 and about 18 wt % ozone, as the reactant for the reduction reaction in the photo-degradation of organic pollutants.

Ozone gas is preferably generated by an electrochemical method which offers both process and cost benefits. Electrochemical methods generate ozone by the electrolysis of water using a specially designed electrochemical cell. Sources of electrical power and water are the only requirements for producing $O_3$ electrochemically. The need for drying an oxygen gas stream is eliminated and there are no toxic by-products formed. The reactions occur by applying DC power between the anode and cathode which are placed on either side of a proton-exchange membrane (PEM), preferably made from a perfluorinated sulfonic acid (PFSA) polymer which displays a very high resistance to chemical attack. The use of a PEM instead of a liquid electrolyte offers several advantages: (i) fluid management is simplified and the potential for leakage of corrosive liquids is eliminated; and (ii) the PEM/anode interface provides a chemical environment which is well-suited to the electrochemical $O_3$ reaction. Water is fed to the anode side where water oxidation takes place through the thermodynamically favored $O_2$ evolution reaction, and the $O_3$ formation reaction.

Utilization of high overpotentials and certain electrode materials selectively enhance $O_3$ formation at the expense of $O_2$ evolution. The water oxidation reactions also yield protons and electrons which are recombined at the cathode. Electrons are conducted to the cathode via the external circuit. The cathodic reaction is the reduction of $O_2$, wherein air typically serves as the $O_2$ source.

While the foregoing is directed to the preferred embodiment of the present invention, other and further embodiments of the invention may be devised without departing from the basic scope thereof, and the scope thereof is determined by the claims which follow.

What is claimed is:

1. A process comprising the steps of:
   providing methane over a photocatalyst disposed on a first surface of a porous substrate having pores extending therethrough to a second surface;
   providing a reactant to the second surface and through the pores of the substrate into contact with the photocatalyst on the first surface; and
   directing light onto the photocatalyst, wherein the light is selected from visible light, ultraviolet light and mixtures thereof.

2. The process of claim 1, wherein the photocatalyst is selected from titanium dioxide, tungsten oxide, bismuth trioxide, ruthenium oxide, iron oxide, cadmium sulfide and mixtures thereof.

3. The process of claim 1, wherein the photocatalyst comprises a titanium dioxide based binary oxide.

4. The process of claim 3, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

5. The process of claim 1, wherein the reactant contains an oxidant selected from oxygen, ozone, hydrogen peroxide and combinations thereof.

6. The process of claim 1, wherein the reactant comprises protons in solution.

7. The process of claim 1, wherein the reactant comprises electron transfer molecules.

8. The process of claim 1, further comprising the steps of:
flowing the methane through a fluid cell adjacent the photocatalyst, the fluid cell comprising a light transmission surface positioned to expose the photocatalyst, a fluid inlet, and a fluid outlet; and
flowing the reactant through a reactant cell adjacent the photocatalyst, the reactant cell comprising a reactant inlet.

9. The process of claim 1, wherein the methane is in the gaseous state.

10. The process of claim 9, wherein the reactant is in the gaseous state.

11. The process of claim 8, further comprising the step of: removing methanol from the fluid cell.

12. The process of claim 11, wherein the oxidant comprises between about 10% and about 18% by weight of electrochemically generated ozone.

13. The process of claim 12, wherein the ultraviolet source is solar light and the ultraviolet transmission surface of the fluid cell is a ultraviolet transmission surface of a solar photoreactor.

14. The process of claim 12, wherein the ultraviolet source is an ultraviolet lamp and the ultraviolet transmission surface of the fluid cell is a ultraviolet transmission surface of the ultraviolet lamp.

15. The process of claim 12, wherein the ultraviolet source is an ultraviolet lamp which includes the ultraviolet wavelength range of 300–400 nm.

16. The process of claim 1, further comprising, the step of:
providing a two-phase or three-phase interface between the photocatalyst, the methane and the reactant; and
converting the methane at the interface.

17. The process of claim 16, further comprising the step of: producing methanol.

18. The process of claim 16, further comprising the step of: producing hydrogen.

19. A process, comprising the steps of:
providing methane over a photocatalyst having pores therethrough, wherein the photocatalyst has a metal catalyst disposed thereon;
providing a reactant through the pores into contact with the photocatalyst; and
directing light onto the photocatalyst, wherein the light is selected from visible light, ultraviolet light and mixtures thereof.

20. The process of claim 19, wherein photocatalyst is selected from titanium dioxide, tungsten oxide, bismuth trioxide, ruthenium oxide, iron oxide, cadmium sulfide and mixtures thereof.

21. The process of claim 19, wherein the photocatalyst comprises a titanium dioxide based binary oxide.

22. The process of claim 21, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

23. The process of claim 19, wherein the reactant comprises an oxidant selected from oxygen, ozone, hydrogen peroxide and combinations thereof.

24. The process of claim 19, wherein the reactant comprises protons in solution.

25. The process of claim 19, wherein the reactant comprises electron transfer molecules.

26. The process of claim 19, further comprising the steps of:
flowing the methane through a fluid cell adjacent the photocatalyst, the fluid cell comprising a light transmission surface positioned to expose the photocatalyst, a fluid inlet, and a fluid outlet; and
flowing the reactant through a reactant cell adjacent the photocatalyst, the reactant cell comprising a reactant inlet.

27. The process of claim 19, wherein the metal catalyst is selected from Pt group metals, Au group metals, Ir, Ru, Sn, Os, Mo, Zr, Ni, Nb, Rh; and mixtures thereof.

28. The process of claim 19, wherein the metal catalyst is selected from, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, Pt—Ni—Ta and mixtures thereof.

29. The process of claim 19, wherein the metal catalyst is selected from Pt group metal oxides, Au group metal oxides, $SnO_2$, $WO_3$, $WO_3$, $IrO_2$, $Rh_2O_3$, $RuO_2$ and mixtures thereof.

30. The process of claim 19, wherein the metal catalyst is selected from Pt group metals, Au group metals, Ir, Ru, Sn, Os, Mo, Zr, Ni, Nb, Rh, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, Pt—Ni—Ta, Pt group metal oxides, Au group metal oxides, $SnO_2$, $WO_3$, $WO_3$, $IrO_2$, $Rh_2O_3$, $RuO_2$ and mixtures thereof.

31. The process of claim 19, wherein the photocatalyst comprises between about 0.01 wt % and about 5 wt % metal catalyst.

32. The process of claim 26, further comprising the step of: removing methanol from the fluid cell.

33. The process of claim 32, wherein the oxidant comprises between about 10% and about 18% by weight of electrochemically generated ozone.

34. The process of claim 33, wherein the ultraviolet source is solar light and the ultraviolet transmission surface of the fluid cell is a ultraviolet transmission surface of a solar photoreactor.

35. The process of claim 33, wherein the ultraviolet source is an ultraviolet lamp and the ultraviolet transmission surface of the fluid cell is a ultraviolet transmission surface of the ultraviolet lamp.

36. The process of claim 33, wherein the ultraviolet source is an ultraviolet lamp which includes the ultraviolet wavelength range of 300–400 nm.

37. The process of claim 19, further comprising, the step of:
providing a two-phase or three-phase interface between the solid photocatalyst, the methane and the reactant; and
converting methane at the interface.

38. The process of claim 19, wherein the methane is in the gaseous state.

39. The process of claim 38, wherein the reactant is in the gaseous state.

40. The process of claim 1, wherein the photocatalyst is doped with a metal selected from titanium, vanadium, chromium, manganese, iron, cobalt, nickel, copper, zinc, ruthenium, lanthanum, lithium, silver, platinum, and mixtures thereof.

41. The process of claim 1, wherein the photocatalyst is a semiconductor and the light has an energy equal to or higher than the band gap energy to generate electrons and holes in the semiconductor.

42. A process comprising the steps of:

providing a reactant over a photocatalyst disposed on a first surface of a porous substrate having pores extending therethrough to a second surface;

providing methane to the second surface and through the pores of the substrate into contact with the photocatalyst on the first surface; and directing light onto the photocatalyst, wherein the light is selected from visible light, ultraviolet light and mixtures thereof.

43. The process of claim 42, further comprising the step of: photocatalytically oxidizing the methane to methanol at the photocatalyst surface.

* * * * *